United States Patent
Gershoni et al.

(10) Patent No.: US 9,872,335 B2
(45) Date of Patent: Jan. 16, 2018

(54) ITERATIVE RECEIVER WAKE-UP FOR LONG DRX PERIODS

(71) Applicant: Marvell International Ltd., Hamilton (BM)

(72) Inventors: Shay Gershoni, Hadera (IL); Nir Binshtok, Tel Aviv (IL)

(73) Assignee: MARVELL INTERNATIONAL LTD., Hamilton (BM)

( * ) Notice: Subject to any disclaimer, the term of this patent is extended or adjusted under 35 U.S.C. 154(b) by 108 days.

(21) Appl. No.: 15/052,907

(22) Filed: Feb. 25, 2016

(65) Prior Publication Data

US 2016/0262202 A1    Sep. 8, 2016

Related U.S. Application Data

(60) Provisional application No. 62/129,582, filed on Mar. 6, 2015.

(51) Int. Cl.
*H04W 76/04* (2009.01)
*H04W 52/02* (2009.01)

(52) U.S. Cl.
CPC ..... *H04W 76/048* (2013.01); *H04W 52/0235* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 4,453,834 A | 6/1984 | Suzuki et al. | |
| 5,659,884 A | 8/1997 | Daughtry et al. | |
| 5,757,244 A | 5/1998 | Nonaka et al. | |
| 5,875,388 A | 2/1999 | Daughtry, Jr. et al. | |
| 5,883,550 A | 3/1999 | Watanabe et al. | |
| 5,953,648 A | 9/1999 | Hutchison et al. | |
| 6,212,398 B1 | 4/2001 | Roberts et al. | |

(Continued)

FOREIGN PATENT DOCUMENTS

| CN | 1379942 A | 11/2002 |
|---|---|---|
| CN | 101541073 A | 9/2009 |

(Continued)

OTHER PUBLICATIONS

Nihon Dempa Kogyo Co. Ltd., "NX32255A Crystal Unit", Data Sheet, 1 page, Nov. 14, 2011.

(Continued)

*Primary Examiner* — Hassan Kizou
*Assistant Examiner* — Ashil Farahmand

(57) ABSTRACT

A method for communication includes, in a wireless communication terminal, estimating a wake-up time that is intended to not exceed an occurrence time of a periodic transmission that is addressed to the wireless communication terminal from a wireless network. Circuitry of the wireless communication terminal is activated at the estimated wake-up time for receiving the periodic transmission. In response to finding, upon activating the circuitry, that the estimated wake-up time is too early to coincide with the periodic transmission, a next wake-up time, which is also intended to not exceed the occurrence time of the periodic transmission, is re-estimated, and the circuitry is deactivated until the re-estimated next wake-up time.

12 Claims, 2 Drawing Sheets

(56) References Cited

U.S. PATENT DOCUMENTS

| | | |
|---|---|---|
| 6,272,190 B1 | 8/2001 | Campana |
| 6,453,181 B1* | 9/2002 | Challa .................. H03L 1/00 |
| | | 455/343.4 |
| 6,463,266 B1 | 10/2002 | Shohara |
| 6,522,212 B1 | 2/2003 | Kodim |
| 6,636,121 B2 | 10/2003 | Barak et al. |
| 6,738,607 B2 | 5/2004 | Ashkenazi |
| 6,985,705 B2 | 1/2006 | Shohara |
| 7,221,921 B2 | 5/2007 | Maligeorgos et al. |
| 7,307,480 B2 | 12/2007 | Shiu et al. |
| 7,403,078 B2 | 7/2008 | Routama et al. |
| 7,466,209 B2 | 12/2008 | Babitch |
| 7,548,130 B2 | 6/2009 | Kobayashi |
| 7,728,684 B2 | 6/2010 | Tozer |
| 8,031,024 B1 | 10/2011 | Zaslavsky |
| 8,731,119 B2 | 5/2014 | Ben-Eli |
| 8,742,863 B1 | 6/2014 | Zaslavsky |
| 9,113,475 B2 | 8/2015 | Ben-Eli |
| 9,289,422 B2 | 3/2016 | Ben-Eli et al. |
| 2002/0158693 A1 | 10/2002 | Soong et al. |
| 2003/0144020 A1 | 7/2003 | Challa et al. |
| 2005/0064818 A1 | 3/2005 | Assarsson et al. |
| 2005/0088314 A1 | 4/2005 | O'Toole et al. |
| 2005/0093638 A1 | 5/2005 | Lin et al. |
| 2006/0267703 A1 | 11/2006 | Wang et al. |
| 2007/0165594 A1 | 7/2007 | Heinle et al. |
| 2007/0178875 A1 | 8/2007 | Rao et al. |
| 2007/0188254 A1 | 8/2007 | Sutardja et al. |
| 2009/0195322 A1 | 8/2009 | Yan et al. |
| 2010/0112950 A1 | 5/2010 | Haartsen et al. |
| 2010/0331019 A1 | 12/2010 | Bhattacharjee et al. |
| 2011/0066297 A1 | 3/2011 | Saberi et al. |
| 2011/0092163 A1 | 4/2011 | Baurque |
| 2011/0176465 A1 | 7/2011 | Panta et al. |
| 2011/0261909 A1 | 10/2011 | Andgart et al. |
| 2011/0306315 A1 | 12/2011 | Subrahmanya et al. |
| 2012/0069800 A1 | 3/2012 | Soliman et al. |
| 2012/0236920 A1* | 9/2012 | Ben-Eli ............ H04W 52/0235 |
| | | 375/226 |
| 2014/0301263 A1* | 10/2014 | Ji ...................... H04W 52/0216 |
| | | 370/311 |
| 2015/0091702 A1 | 4/2015 | Gupta et al. |
| 2015/0173039 A1* | 6/2015 | Rune ................ H04W 52/0216 |
| | | 370/311 |

FOREIGN PATENT DOCUMENTS

| | | |
|---|---|---|
| GB | 2368235 A | 4/2002 |
| WO | 0133870 A2 | 5/2001 |
| WO | 0247281 A1 | 6/2002 |
| WO | 2005099107 A1 | 10/2005 |

OTHER PUBLICATIONS

3GPP TS 36.304., "3rd Generation Partnership Project;Technical Specification Group Radio Access Network; 20 Evolved Universal Terrestrial Radio Access (E-UTRA); User Equipment (UE) Procedures in Idle Mode", Release 12, version 12.4.0, 38 pages, Mar. 2015.

3GPP TS 25.304., "3rd Generation Partnership Project;Technical Specification Group Radio Access Network;User Equipment (UE) procedures in idle mode and procedures for cell reselection in connected mode", Release 12, version 12.4.0, 58 pages, Dec. 2014.

3GPP TS 43.022., "3rd Generation Partnership Project;Technical Specification Group GSM/EDGE Radio Access Network;Functions related to Mobile Station (MS) in idle mode and group receive mode," Release 12, version 12.0.0, 24 pages, Aug. 2014.

3GPP TS 25.211, "3rd Generation Partnership Project; Technical Specification Group Radio Access Network; Physical channels and mapping of transport channels onto physical channels (FDD) (Release 6)", V6.10.0, Chapter 5, 35 pages Sep. 2009.

3GPP TS 25.214, "3rd Generation Partnership Project; Technical Specification Group Radio Access Network; Physical layer procedures (FDD) (Release 6)", V6.11.0, Annex C, 6 pages, Dec. 2006.

Kanodia et al., "MOAR: A Multi-channel Opportunistic Auto-rate Media Access Protocol for Ad Hoc Networks", Proceedings to the First International Conference on Broadband Networks (Broadnets'04), pp. 600-610, Oct. 25-29, 2004.

* cited by examiner

ITERATIVE RECEIVER WAKE-UP FOR LONG DRX PERIODS

CROSS-REFERENCE TO RELATED APPLICATIONS

This application claims the benefit of U.S. Provisional Patent Application 62/129,582, filed Mar. 6, 2015, whose disclosure is incorporated herein by reference.

FIELD OF THE DISCLOSURE

The present disclosure relates generally to wireless communication, and particularly to methods and systems for receiver wake-up schemes.

BACKGROUND

Some communication systems operate wireless communication terminals intermittently, such as in a discontinuous reception (DRX) mode in which the terminal activates its receiver for short durations in accordance with a specified periodic cycle. DRX operation in Long-Term Evolution (LTE) systems is specified, for example, in "3rd Generation Partnership Project; Technical Specification Group Radio Access Network; Evolved Universal Terrestrial Radio Access (E-UTRA); User Equipment (UE) Procedures in Idle Mode (Release 12)," TS 36.304, version 12.4.0, March, 2015, which is incorporated herein by reference.

In Universal Mobile Telecommunications System (UMTS) networks, the DRX mode is specified in "3rd Generation Partnership Project; Technical Specification Group Radio Access Network; User Equipment (UE) Procedures in Idle Mode and Procedures for Cell Reselection in Connected Mode (Release 12)," TS 25.304, version 12.4.0, December, 2014, which is incorporated herein by reference.

DRX operation in Global System for Mobile communications (GSM) is specified, for example, in "3rd Generation Partnership Project; Technical Specification Group GSM/EDGE Radio Access Network; Functions Related to Mobile Station (MS) in Idle Mode and Group Receive Mode (Release 12)," TS 43.022, version 12.0.0, August, 2014, which is incorporated herein by reference.

The description above is presented as a general overview of related art in this field and should not be construed as an admission that any of the information it contains constitutes prior art against the present patent application.

SUMMARY

An embodiment that is described herein provides a method for communication. The method includes, in a wireless communication terminal, estimating a wake-up time that is intended to not exceed an occurrence time of a periodic transmission that is addressed to the wireless communication terminal from a wireless network. Circuitry of the wireless communication terminal is activated at the estimated wake-up time for receiving the periodic transmission. In response to finding, upon activating the circuitry, that the estimated wake-up time is too early to coincide with the periodic transmission, a next wake-up time, which is also intended to not exceed the occurrence time of the periodic transmission, is re-estimated, and the circuitry is deactivated until the re-estimated next wake-up time.

In some embodiments, downlink signals from the wireless network, including the periodic transmission, are transmitted in time frames, and the method further includes, upon activating the circuitry at the estimated wake-up time, synchronizing to a timing of the wireless network using one or more of: reference signals that are transmitted by the wireless network multiple times per time frame, and signaling messages that are transmitted by the wireless network one or more times per time frame.

In an embodiment the method further includes, in response to finding, upon activating the circuitry at the re-estimated next wake-up time, that the re-estimated next wake-up time is still too early to coincide with the periodic transmission, performing one or more additional iterations of re-estimating a subsequent wake-up time and deactivating the circuitry until a subsequent re-estimated wake-up time.

In another embodiment, estimating the wake-up time includes estimating the occurrence time of the periodic transmission using an internal clock of the wireless communication terminal; calculating a time margin that depends on an accuracy of the internal clock over a specified range of one or more operating conditions; and setting the wake-up time to be at least the time margin before the estimated occurrence time of the periodic transmission.

In yet another embodiment, finding that the estimated wake-up time is too early includes identifying that a remaining time until the periodic transmission exceeds a predefined time threshold. In a disclosed embodiment, estimating the wake-up time includes calculating the wake-up time so as to be in advance of the occurrence time of the periodic transmission, and re-estimating the next wake-up time includes calculating the next wake-up time so as to coincide with or be in advance of the occurrence time of the periodic transmission.

There is additionally provided, in accordance with an embodiment that is described herein, a communication apparatus including a front end and a processor. The processor is configured to estimate a wake-up time that is intended to not exceed an occurrence time of a periodic transmission that is addressed to the apparatus from a wireless network, to activate circuitry of the communication apparatus at the estimated wake-up time for receiving the periodic transmission, and, in response to finding, upon activating the circuitry, that the estimated wake-up time is too early to coincide with the periodic transmission from the wireless network, to re-estimate a next wake-up time that is also intended to not exceed the occurrence time of the periodic transmission, and to deactivate the circuitry until the re-estimated next wake-up time.

In some embodiments, a wireless communication terminal includes the disclosed apparatus. In some embodiments, a chipset for processing signals in a wireless communication terminal includes the disclosed apparatus.

The present disclosure will be more fully understood from the following detailed description of the embodiments thereof, taken together with the drawings in which:

DETAILED DESCRIPTION OF EMBODIMENTS

Figure 1:
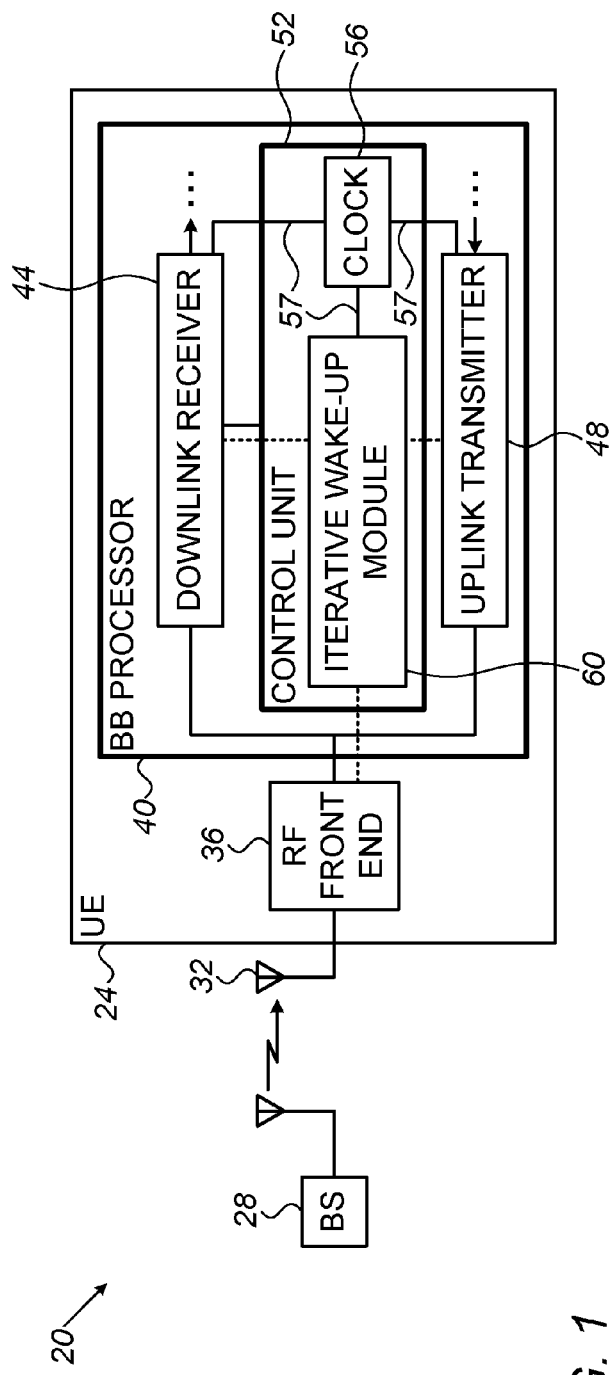
FIG. 1 is a block diagram that schematically illustrates a wireless communication system, in accordance with an embodiment that is described herein.

Embodiments that are described herein provide improved methods and systems for intermittent wake-up of circuitry in wireless communication terminals. In some embodiments, a wireless network instructs a wireless communication terminal to operate in a Discontinuous Reception (DRX) mode. In this mode, the terminal is configured to wake-up and receive transmissions from the network at designated wake-up times, in accordance with a specified periodic cycle. During the inactivity periods between the designated wake-up times, the terminal typically deactivates much of its circuitry, with the exception of some minimal circuitry needed for time tracking and wake-up.

In a typical wireless communication terminal of an embodiment, the circuitry that remains active during the inactivity periods comprises a low-power clock oscillator, plus some ancillary logic. This circuitry is optimized, in an embodiment, for low cost and/or extremely low power consumption, and has limited accuracy. In particular, the clock oscillator frequency tends to be sensitive to temperature variations. Moreover, in some applications, such as in various Internet-of-Things (IoT) applications, the inactivity periods of the DRX cycle are extremely long, sometimes on the order of hours.

The combination of these two factors—clock oscillator having limited accuracy, and long inactivity periods—imply that the terminal has a high probability of waking-up long before or long after the designated wake-up time. For example, since the actual wake-up time suffers from large variations due to the inaccurate clock oscillator, the terminal needs to wake-up much earlier (according to its internal clock) than the designated wake-up time, in order not to overshoot the designated wake-up time in case the clock oscillator is much slower than the network clock.

Thus, in an embodiment, the terminal estimates and sets an actual wake-up time that precedes the designated wake-up time by a large time margin. The time margin is defined to guarantee that the actual wake-up time will, with relatively high certainty, not exceed the designated wake-up time, even under worst-case errors of the clock oscillator.

In practice, however, the worst-case errors occur only rarely. In most cases the actual wake-up time is far too early to coincide with the designated wake-up time. It is possible in principle to retain the terminal circuitry active from the actual wake-up time until the designated wake-up time. This naïve solution, however, is costly in terms of power consumption.

In some embodiments that are described herein, in response to waking-up and finding that the actual wake-up time is too early to coincide with the designated wake-up time, the terminal re-estimates the actual wake-up time and deactivates its circuitry until the re-estimated wake-up time. This process may be repeated multiple iterative times, until the actual wake-up time sufficiently approaches the designated wake-up time to be within a predetermined tolerance. At this point, the terminal remains active to receive the transmission from the network.

The iterative wake-up scheme described above prevents the terminal from remaining unnecessarily active for long periods of time, and therefore reduces power consumption considerably.

FIG. 1 is a block diagram that schematically illustrates a wireless communication system 20, in accordance with an embodiment that is described herein. In the present example, system 20 is a mobile or cellular system operating in accordance with the LTE specifications noted above. In alternative embodiments, however, the disclosed techniques can be applied in wireless systems that operate in accordance with any other suitable communication protocol, such as in UMTS, GSM or other non-wireless communications systems.

In the example of FIG. 1, system 20 comprises a wireless communication terminal 24 that communicates with a wireless network, e.g., with a base station (BS) 28. In LTE terminology, terminal 24 is also referred to as a User Equipment (UE), and BS 28 is also referred to as an eNodeB. Although the terminology used herein is consistent with LTE technologies, for the purposes of convenience and clarity, this is not to be construed as limiting to cellular communication systems. FIG. 1 shows a single UE and a single BS for the sake of clarity. In typical implementations of system 20, however, the system comprises multiple UEs and the wireless network comprises multiple BSs.

UE 24 may comprise, for example, a cellular phone, a smartphone, a wireless-enabled tablet or other computing device, an Internet-of-Things (IoT), Machine-Type Communication (MTC) or Machine-to-Machine (M2M) wireless device, or any other suitable type of wireless terminal. In an example embodiment, UE 24 comprises a CAT-0 LTE device, or other type of device specified for MTC applications. Such wireless devices and associated communication protocols are also sometimes referred to as CAT-M, LTE-M, Cellular IoT (CIoT) or Narrowband-LTE (NB-LTE).

In an embodiment, UE 24 comprises at least one antenna 32, a Radio Frequency (RF) front end 36, and a baseband (BB) processor 40. Antenna 32 is configured to receive RF downlink signals from the wireless network and to transmit RF uplink signals to the wireless network. RF front end 36 is configured to down-convert the received downlink signals from RF to baseband, to up-convert uplink signals for transmission from baseband to RF, and to perform other functions such as filtering and amplification of both reception and transmission.

BB processor 40, which is also referred to herein simply as "processor" for brevity, is configured to carry out the various baseband processing tasks of UE 24. In the described embodiment, BB processor comprises a downlink receiver 44 for processing the received downlink signals, an uplink transmitter 48 for generating and processing uplink signals for transmission, and a control unit 52 that controls and manages the UE operation. Downlink receiver 44 is also referred to as a demodulator, uplink transmitter 48 is also referred to as a modulator, and receiver 44 and transmitter 48 are also referred to jointly as a modem.

In an embodiment, control unit 52 comprises a clock module 56, which generates one or more clock signals 57 for operating downlink receiver 44, uplink transmitter 48 and/or RF front end 36. In an embodiment, one of clock signals 57 output by clock module 56 comprises a timing clock that is used for setting and tracking the timing of the communication protocol on the UE side. In an embodiment, clock module 56 generates the timing clock using a low-cost and low-current 32 KHz oscillator. In an embodiment, the 32 KHz oscillator is an inexpensive, non-temperature-compensated crystal oscillator. The temperature sensitivity of such an oscillator, in an embodiment, reached 2.5 ppm/° C., although oscillators having any other temperature sensitivity can be used.

In an embodiment, control unit 52 further comprises an iterative wake-up module 60 that performs intermittent wake-up and deactivation of circuitry in UE in order to reduce power consumption. In various embodiments, iterative wake-up module 60 wakes-up and deactivates circuitry in downlink receiver 44, uplink transmitter 48, RF front end 36, and/or any other suitable circuitry in UE 24. Example intermittent wake-up schemes that are carried out by iterative wake-up module 60 are described in detail below.

The UE and system configurations shown in FIG. 1 are example configurations, which are depicted solely for the sake of clarity. In alternative embodiments, any other suitable UE and/or system configuration can also be used. For example, in alternative embodiments UE 24 receives transmissions from multiple BSs 28, e.g., in various Coordinated Multipoint (CoMP) schemes. Some UE elements that are not mandatory for understanding of the disclosed techniques have been omitted from the figure for the sake of clarity.

The different elements of UE 24 typically are implemented using dedicated hardware, such as using one or more Application-Specific Integrated Circuits (ASICs), Field-Programmable Gate Arrays (FPGAs) and/or RF Integrated Circuits (RFICs). Alternatively, some UE elements, e.g., control unit 52 or parts thereof, may be implemented using software executing on programmable hardware, or using a combination of hardware and software elements. In some embodiments, some or all of the elements of BB processor 40 and possibly RF front-end 36 are fabricated in a chip-set.

When implementing the disclosed techniques in software on a programmable processor, the software may be downloaded to the processor in electronic form, over a network, for example, or it may, alternatively or additionally, be provided and/or stored on non-transitory tangible media, such as magnetic, optical or electronic memory.

Figure 2:
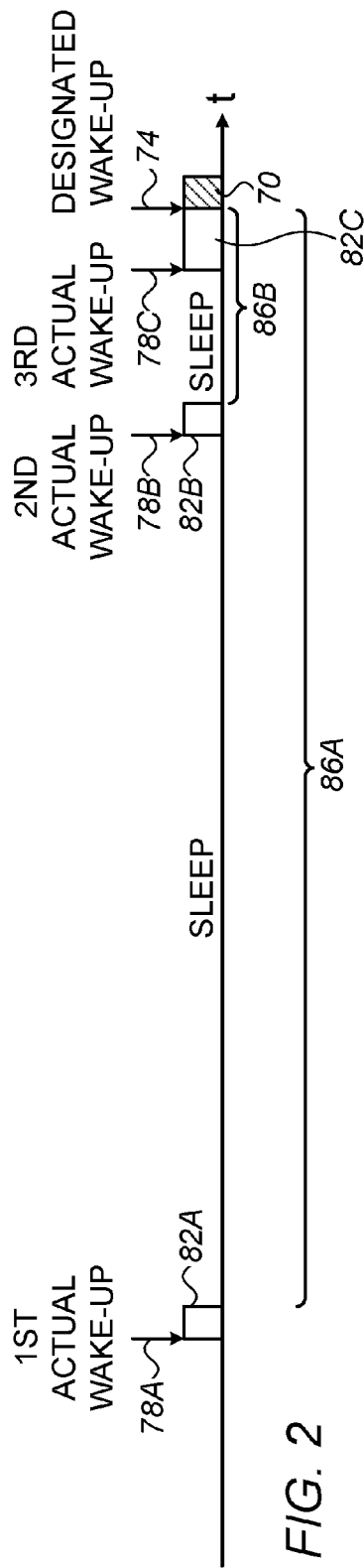
FIG. 2 is a diagram that schematically illustrates an iterative wake-up scheme in a wireless communication terminal, in accordance with an embodiment that is described herein.

FIG. 2 is a diagram that schematically illustrates an iterative wake-up scheme that is carried out by UE 24, in accordance with an embodiment that is described herein. In the present example, the wireless network has instructed UE 24 to wake-up at a designated wake-up time 74, in order to receive from the wireless network a transmission 70 that is addressed to the UE. Typically, transmission 70 is one occurrence of the periodic downlink transmissions from the network, in accordance with the DRX cycle specified for UE 24.

In an embodiment, transmission 70 comprises an allocation message, which informs the UE of downlink and/or uplink resource allocations that are assigned to the UE. In other words, in this embodiment transmission 70 indicates to the UE that a downlink message is about to be sent to it on certain time-frequency bins, and/or that certain time-frequency bins have been allocated to the UE for transmitting uplink messages to the wireless network.

In order to wake-up and receive transmission 70 successfully, iterative wake-up module 60 estimates a first actual wake-up time 78A. In an embodiment, iterative wake-up module 60 sets the actual wake-up time to precede the designated wake-up time by a certain time margin. The time margin typically depends on the accuracy of clock module 56 over the applicable temperature range. In one non-limiting example, a normal temperature range is [−20 . . . +55° C.], and an extended temperature range is [−40 . . . +85° C.]. Additionally or alternatively, the time margin depends on the accuracy of clock module 56 over specified ranges of other operating conditions, such as aging time, supply voltage and even process variations.

In an embodiment, the time margin is set to be sufficient large so as to ensure that the UE will not overshoot (i.e., exceed the occurrence time of) the designated wake-up time 74.

At time 78A, iterative wake-up module 60 activates the UE circuitry for a time interval 82A. During this time interval, BB processor 40 receives downlink signals from the wireless network (e.g., from BS 28) and synchronizes to the timing of the wireless network using the received downlink signals.

In various wireless communication protocols the downlink signal transmitted from the wireless network is divided into time intervals that are referred to as time frames. In LTE terminology, for example, such time intervals or time frames are referred to as sub-frames. Typically, each time frame comprises, in addition to user data, Reference Signals (RSs) and signaling messages. The RSs are typically transmitted multiple times per time frame, e.g., in a periodic pattern of time-frequency bins within the time frame. Signaling messages are typically transmitted once or more per time frame, e.g., in the first symbols of each frame.

In various embodiments, BB processor 40 synchronizes to the network timing by receiving one or more of the RSs, and/or one or more of the signaling messages (e.g., a physical broadcast channel—PBCH or a synchronization channel—SCH). In either case, the RSs or signaling messages occur much more frequently than transmissions 70—The DRX cycle typically has a period that is multiple time frames in length.

Additionally or alternatively, BB processor 40 may synchronize to the timing of the wireless network during interval 82A in any other suitable way and using any other suitable signal from the network.

In the present context, the term "synchronizing to the network timing" means that BB processor 40 synchronizes the internal time kept by UE 24 with the reference time of the wireless network. As a result, the time error that was accumulated by the UE over the previous inactivity period, e.g., due to the limited accuracy of clock module 56, is reset to zero.

In the present example, after synchronizing to the timing of the wireless network, control unit 52 finds that the actual wake-up time (time 78A) was too early to coincide with the designated wake-up time (time 74). In an embodiment, control unit 52 estimates a time duration 86A remaining until designated wake-up time 74. This estimate is highly accurate, since the UE has just synchronized with the network timing. If time duration 86A is larger than the threshold, control unit 52 concludes that wake-up time 78A was too early, and vice versa.

In response to deciding that wake-up time 78A was too early, control unit 52 re-estimates the next actual wake-up time based on duration 86A, which is also intended not to exceed the designated wake-up time 74, and iterative wake-up module 60 deactivates the UE circuitry.

In the present example, clock module 56 is relatively inaccurate, and therefore iterative wake-up module 60 wakes-up the UE circuitry at a second actual wake-up time 78B instead of at designated wake-up time 74. During a subsequent time interval 82B, BB processor receives downlink signals from the wireless network and synchronizes to the timing of the wireless network.

After synchronizing to the timing of the wireless network, control unit 52 estimates a time duration 86B remaining until designated wake-up time 74. Once again, control unit 52 decides, based on the length of time duration 86B, that wake-up time 78B was too early to coincide with designated wake-up time 74. Therefore, control unit 52 re-estimates the next actual wake-up time based on duration 86B, and iterative wake-up module 60 again deactivates the UE circuitry.

In the next iteration, iterative wake-up module 60 wakes-up the UE circuitry at a third actual wake-up time 78C, and processor 40 synchronizes to the timing of the wireless network during an interval 82C. In this iteration, however, control unit 52 decides that wake-up time 78C is sufficiently close to designated wake-up time 74 to remain active to receive subsequent downlink transmission signals after designated wake-up before returning to a partially inactivate state. For example, control unit 52 may find that the remaining time until designated wake-up time 74 is smaller than the predefined time threshold. Consequently, iterative wake-up module 60 retains the UE circuitry active. BB processor 40 subsequently receives and decodes transmission 70.

The time periods during which UE 24 is inactive are marked "SLEEP" in FIG. 2. As can be seen in the figure, the disclosed technique enables UE 24 to remain inactive during most of the time from the initial wake-up time 78A until the designated wake-up time 74. As a result, the UE power consumption is reduced considerably, and the UE battery time is extended.

The process shown in FIG. 2 is an example process that is depicted purely by way of example. In alternative embodiments, any other suitable process may be implemented. For example, in an embodiment, the first actual wake-up time is deliberately set to be in advance of the designated wake-up time, and the next actual wake-up time is set to coincide with the designated wake-up time. In one non-limiting example, interval 70 is on the order of 8 mS in length, and intervals 82A, 82B and 82C are on the order of 3 mS in length. The length of the overall DRX cycle varies considerably, e.g., between 32 mS and up to several hours or more.

In some embodiments, the timing error in the internal time kept by the UE is proportional to the length of the inactivity period. As a result, the time margin assumed by control unit 52 diminishes rapidly from one iteration to the next. Therefore, in most practical cases the iterative process comprises no more than 1-3 iterations.

Figure 3:
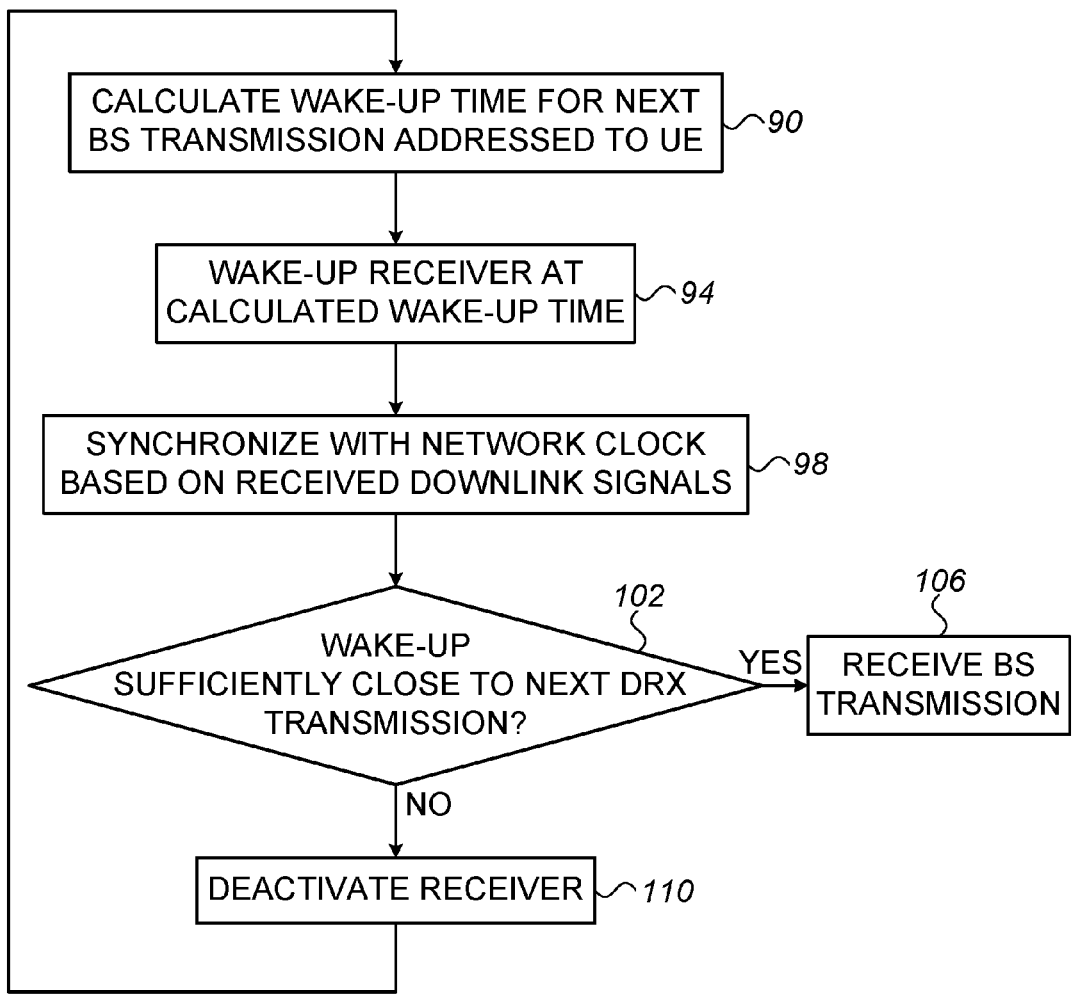
FIG. 3 is a flow chart that schematically illustrates a method for iterative wake-up in a wireless communication terminal, in accordance with an embodiment that is described herein.

FIG. 3 is a flow chart that schematically illustrates a method for iterative wake-up in UE 24, in accordance with an embodiment that is described herein. The method begins with iterative wake-up module 60 calculating the estimated wake-up time for receiving the next transmission from BS 28, at a wake-up time estimation operation 90.

At an activation operation 94, iterative wake-up module 60 activates the UE circuitry at the estimated wake-up time (estimated at operation 90). While the UE circuitry is active, at a synchronization operation 98, BB processor 40 synchronizes the internal time kept by UE 24 with the reference time of the wireless network.

At a checking operation 102, control unit 52 checks whether the actual wake-up time, at which the UE circuitry was activated, is sufficiently close to the designated time of the downlink transmission. If so, at a reception operation 106, the UE remains active and eventually receives the downlink transmission.

Otherwise, iterative wake-up module 60 deactivates the UE circuitry, at a deactivation operation 110. The method then loops back to operation 90 above, in which the UE re-estimates the next wake-up time.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for communication, comprising:
   in a wireless communication terminal, estimating a wake-up time that is intended to not exceed an occurrence time of a periodic transmission that is addressed to the wireless communication terminal from a wireless network;
   at the estimated wake-up time, activating circuitry of the wireless communication terminal for receiving the periodic transmission and synchronizing to downlink signals received from the wireless network; and
   in response to finding, upon activating the circuitry and synchronizing to the downlink signals, that a remaining time until the periodic transmission exceeds a predefined time threshold, re-estimating a next wake-up time that is also intended to not exceed the occurrence time of the periodic transmission, and deactivating the circuitry until the re-estimated next wake-up time.

2. The method according to claim 1, wherein downlink signals from the wireless network, including the periodic transmission, are transmitted in time frames, and comprising, upon activating the circuitry at the estimated wake-up time, synchronizing to a timing of the wireless network using one or more of: reference signals that are transmitted by the wireless network multiple times per time frame, and signaling messages that are transmitted by the wireless network one or more times per time frame.

3. The method according to claim 1, comprising, in response to finding, upon activating the circuitry at the re-estimated next wake-up time, that the re-estimated next wake-up time is still too early to coincide with the periodic transmission, performing one or more additional iterations of re-estimating a subsequent wake-up time and deactivating the circuitry until a subsequent re-estimated wake-up time.

4. The method according to claim 1, wherein estimating the wake-up time comprises:
   estimating the occurrence time of the periodic transmission using an internal clock of the wireless communication terminal;
   calculating a time margin that depends on an accuracy of the internal clock over a specified range of one or more operating conditions; and
   setting the wake-up time to be at least the time margin before the estimated occurrence time of the periodic transmission.

5. The method according to claim 1, wherein estimating the wake-up time comprises calculating the wake-up time so as to be in advance of the occurrence time of the periodic transmission, and wherein re-estimating the next wake-up time comprises calculating the next wake-up time so as to coincide with or be in advance of the occurrence time of the periodic transmission.

6. A communication apparatus, comprising:
   a front end; and
   a processor, which is configured to estimate a wake-up time that is intended to not exceed an occurrence time of a periodic transmission that is addressed to the apparatus from a wireless network, at the estimated wake-up time, to activate circuitry of the communication apparatus for receiving the periodic transmission and synchronizing to downlink signals received from the wireless network, and, in response to finding, upon activating the circuitry and synchronizing to the downlink signals, that a remaining time until the periodic transmission from the wireless network exceeds a predefined time threshold, to re-estimate a next wake-up time that is also intended to not exceed the occurrence time of the periodic transmission, and to deactivate the circuitry until the re-estimated next wake-up time.

7. The apparatus according to claim 6, wherein downlink signals from the wireless network, including the periodic transmission, are transmitted in time frames, and wherein, upon activating the circuitry at the estimated wake-up time, the processor is configured to synchronize to a timing of the wireless network using one or more of: reference signals that are transmitted by the wireless network multiple times per time frame, and signaling messages that are transmitted by the wireless network one or more times per time frame.

8. The apparatus according to claim 6, wherein, in response to finding, upon activating the circuitry at the re-estimated next wake-up time, that the re-estimated next wake-up time is still too early to coincide with the periodic transmission, the processor is configured to perform one or more additional iterations of re-estimating a subsequent wake-up time and deactivating the circuitry until a subsequent re-estimated wake-up time.

9. The apparatus according to claim 6, wherein the processor is configured to estimate the wake-up time by:
    estimating the occurrence time of the periodic transmission using an internal clock of the wireless communication terminal;
    calculating a time margin that depends on an accuracy of the internal clock over a specified range of one or more operating conditions; and
    setting the wake-up time to be at least the time margin before the estimated occurrence time of the periodic transmission.

10. The apparatus according to claim 6, wherein the processor is configured to estimate the wake-up time to be in advance of the occurrence time of the periodic transmission, and to re-estimate the next wake-up time to coincide with or be in advance of the occurrence time of the periodic transmission.

11. A wireless communication terminal comprising the apparatus of claim 6.

12. A chipset for processing signals in a wireless communication terminal, comprising the apparatus of claim 6.

* * * * *